United States Patent [19]

McLean

[11] 4,114,426

[45] Sep. 19, 1978

[54] LIQUID VOLUMETRIC LINE LEAK TESTING APPARATUS

[76] Inventor: F. Ronald McLean, 333 N. Ocean Blvd., Deerfield Beach, Fla. 33441

[21] Appl. No.: 845,443

[22] Filed: Oct. 25, 1977

[51] Int. Cl.² ............................................ G01M 3/08
[52] U.S. Cl. .................................... 73/40.5 R; 73/168
[58] Field of Search .................... 73/40.5 R, 40, 168, 73/49.1, 49.5

[56] References Cited

U.S. PATENT DOCUMENTS

| 2,073,243 | 3/1937 | Liddell et al. | 73/168 X |
| 3,273,753 | 9/1966 | Johnson et al. | 73/40.5 R |

*Primary Examiner*—Jerry W. Myracle
*Attorney, Agent, or Firm*—Oltman and Flynn

[57] ABSTRACT

The present apparatus includes a readily portable carrying case holding all of the equipment needed for detecting a leak in the gasoline line between an above-ground dispensing apparatus and an underground gasoline storage tank, substantially in accordance with my U.S. Pat. No. 3,910,102. The equipment in the carrying case includes a calibrated burette and a funnel for filling it through an opening in the top of the carrying case, a foot or hand operated pump mounted on the inside of the front cover of the case for withdrawing makeup gasoline from the burette, a 160 psi pressure gauge permanently connected to the outlet of this pump, a 15 psi pressure gauge and means for detachably connecting it to the outlet of this pump, an air bleed device and a permanent magnet for mounting it on the dispensing apparatus, a first long flexible hose connecting the pump outlet to the air bleed device, a second long flexible hose connected at one end to the air bleed device, a short connector for detachably connecting the opposite end of the second hose to the pumping system of the dispensing apparatus, an air bleed hose for passing air bubbles and entrained liquid from the air bleed device back to the top of the burette, and a pressure release hose with a normally closed valve extending from the high pressure gauge to the top of the burette.

30 Claims, 10 Drawing Figures

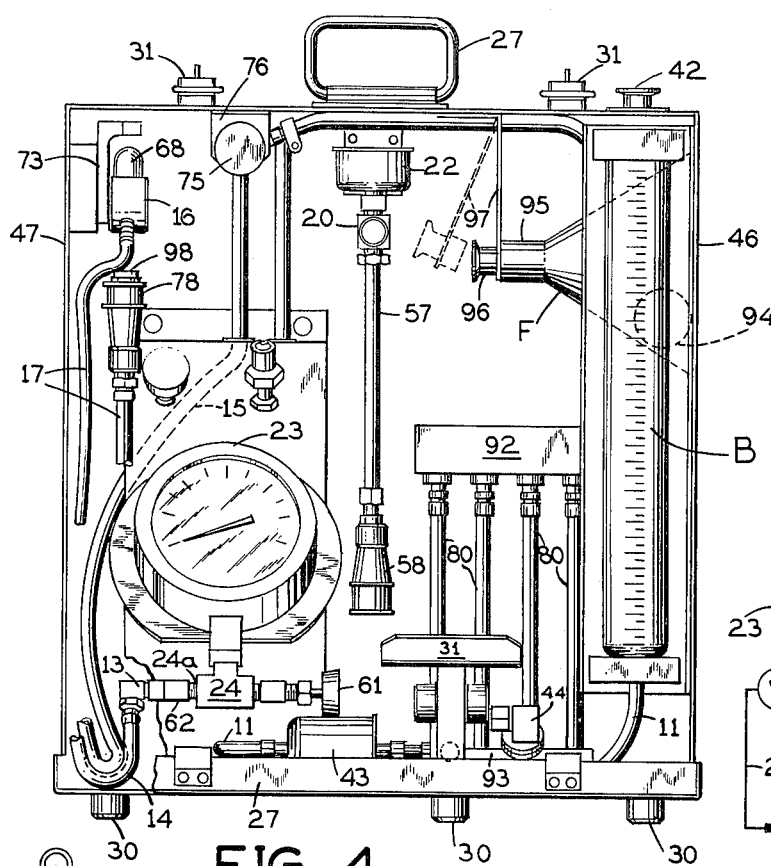

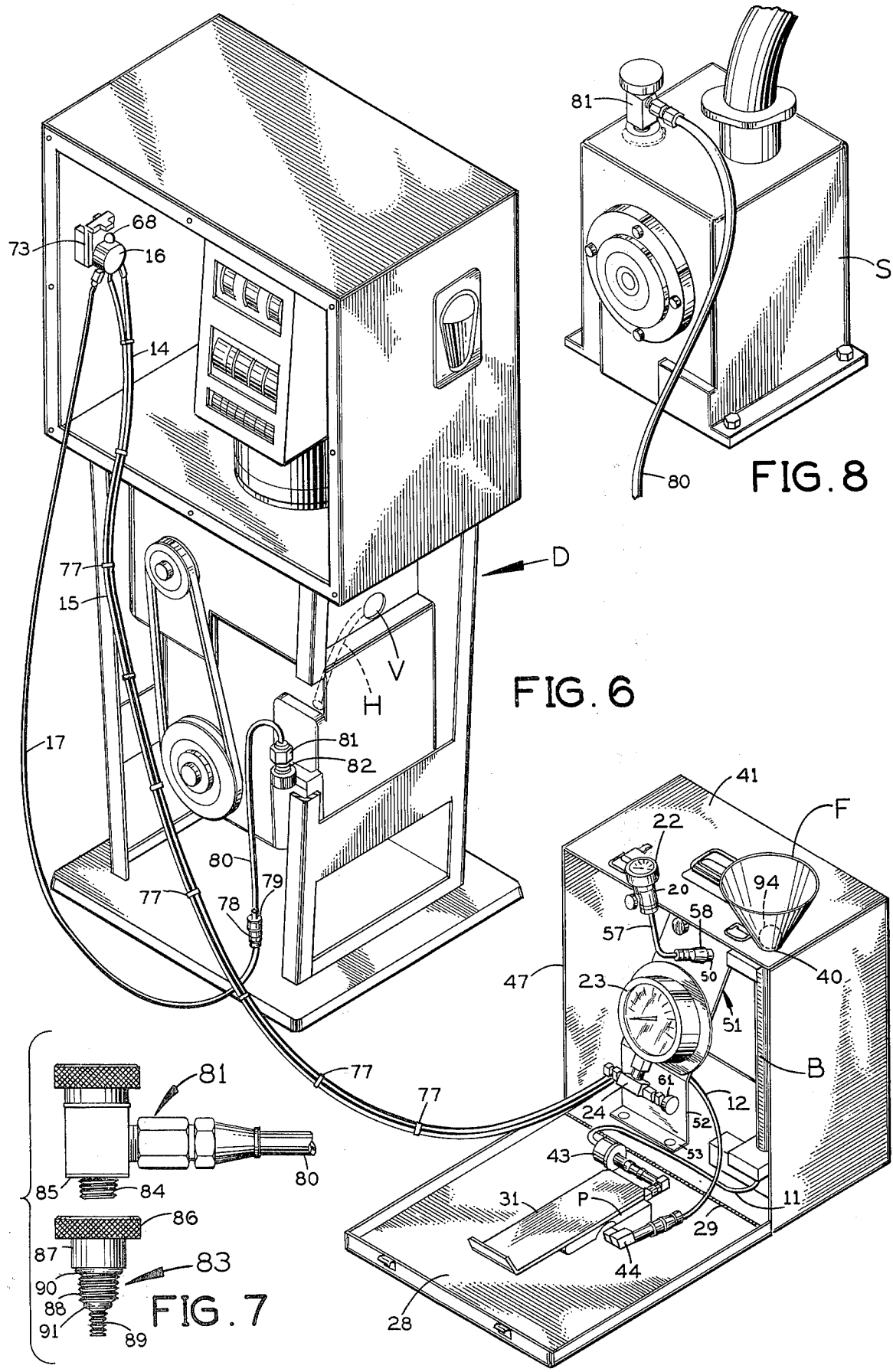

LIQUID VOLUMETRIC LINE LEAK TESTING APPARATUS

BACKGROUND OF THE INVENTION

My U.S. Pat. No. 3,910,102 discloses a novel and advantageous apparatus and method for detecting a leak in a gasoline line that extends from an above-ground gasoline dispensing apparatus down to an underground storage tank provided with a check valve for preventing return flow of gasoline back down into the tank.

SUMMARY OF THE INVENTION

The present invention relates to a compact, self-contained, readily portable apparatus which may be used for the purposes disclosed in my U.S. Pat. No. 3,910,102. The present apparatus has all the elements already assembled and connected and disposed within a carrying case, and requiring only one attachment to be made to the gasoline line for the above-ground gasoline dispensing apparatus.

A principal object of this invention is to provide a novel and improved, readily portable, self-contained apparatus for detecting a leak in such a gasoline line.

Another object of this invention is to provide such an apparatus of relatively light weight having a carrying case and all the functional equipment needed for testing such a line without the need for jack hammers, air compressors, piping, tools, air gauges and various other accessories formerly used in such testing.

Another object of this invention is to provide such a test apparatus which can be mounted to such a gasoline line whether or not there is pressure in the line.

Another object of this invention is to provide such a test apparatus whose connection to such a gasoline line will involve no more than a few drops of gasoline spillage.

Further objects and advantages of this invention will be apparent from the following detailed description of a presently preferred embodiment thereof, which is shown in the accompanying drawings in which:

FIG. 4 is a front elevational view of the apparatus as shown in FIG. 2 but with the low pressure gauge in its stored position inside the carrying case;

FIG. 5 is an enlarged view of the air bleed device in the present apparatus, shown partly in front elevation and partly in section for clarity;

FIG. 6 is a perspective view showing the present apparatus operatively connected to an above-ground gasoline dispensing apparatus containing a suction pump for drawing gasoline from an underground storage tank through a line that is to be tested for leakage by the present apparatus;

FIG. 7 is an exploded elevational view showing one end of a connector and a size adapter for connecting the present test apparatus to the gasoline line for the above-ground dispensing apparatus;

FIG. 8 is a perspective view showing the connector of FIG. 7 connected to the air eliminator of the suction pump in the above-ground dispensing apparatus;

FIG. 9 is a schematic hydraulic circuit diagram of the present apparatus; and

FIG. 10 is a fragmentary perspective view showing in its stored condition in the carrying case the end of the hose in the present apparatus which is to be attached to the opposite end of the FIG. 7 connector so as to connect the present test apparatus to the gasoline line for the above-ground dispensing apparatus.

Figure 1:
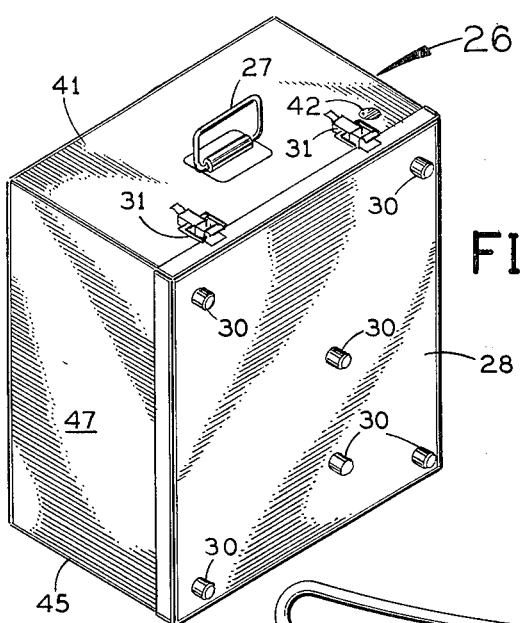
FIG. 1 is a perspective view of the carrying case in the present apparatus with its front cover closed.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

The background of the present invention is described in full detail in my U.S. Pat. No. 3,910,102, which is incorporated by reference herein. As described in that patent, an underground gasoline storage tank in an automotive service station typically is connected to one or more dispensing apparatuses located on a concrete "island" in the service station. The pump for pumping gasoline from the underground storage tank through a line up to the dispensing apparatus may be either a pump located near the tank itself (and remote from the dispensing apparatus) or a suction pump in the dispensing apparatus itself. The present apparatus is equally well suited for detecting a line leak whether the pumping system for the dispensing apparatus is of the remote type or the suction type. In either type, a check valve is provided at the underground storage tank to prevent return flow of gasoline back down into the storage tank when the pump is off. Such systems are well known to those skilled in the art and therefore need not be illustrated herein.

Referring first to FIG. 9, in broad outline the present apparatus has a calibrated burette B for holding makeup gasoline and provided with a separable funnel F which is insertable into the top of the burette for filling it. The lower end of the burette is connected by a short hose 11 to the inlet of a pump P that may be operated by foot or by hand. The outlet of this pump is connected through a short hose 12 to a first T-coupling 13 having a first outlet connected through a first long, flexible hose 14 to an air bleed device 16.

As shown in FIG. 6, this air bleed device may be mounted inside and near the top of the housing of the gasoline dispensing apparatus D, as explained in more detail hereinafter. The air bleed device can be mounted on either the inside or outside of the gasoline dispensing apparatus according to where ferrous metal is available. It can also be mounted on canopy columns or light poles on the island which are frequently the best point for magnetic attachment. A second long, flexible hose 17 leads from the air bleed device 16 to a connection to the gasoline line for the dispensing apparatus D.

In the use of the present leak testing apparatus, the pump P draws makeup gasoline from the bottom of the burette B through hose 11 and pumps it through hose 12, T-fitting 13, and hoses 14 and 17 to the gasoline line for the dispensing apparatus. As explained hereinafter with reference to FIG. 5, the air bleed device permits substantially unimpeded flow of gasoline between its hoses 14 and 17. Any air bubbles in this makeup gasoline are withdrawn from the air bleed device 16 and flow down through a long, flexible, air bleed hose 15 to a connection of this hose to the top of the burette B, where they escape to the atmosphere. A shutoff valve 75 is included in this air bleed line.

The T-fitting 13 also has a second outlet which is connected through a short hose 18 to the inlet of a second T-fitting 19. One outlet of fitting 19 is connected through a manual shutoff valve 20 to a low pressure gauge 22 which reads pressures up to 15 psi, for example. As described in detail hereinafter, the valve 20 and low pressure gauge 22 have a detachable connection to the T-fitting 19. A second outlet of the T-fitting 19 is connected to a high pressure gauge 23 which reads pressures up to 160 psi, for example. This second outlet also is connected through a manual shutoff valve 24 to a flexible pressure release hose 25 which extends up to the top of the burette B. When valve 24 is open, pressure in the line being tested or in the present testing unit is relieved to the atmosphere.

Figure 2:
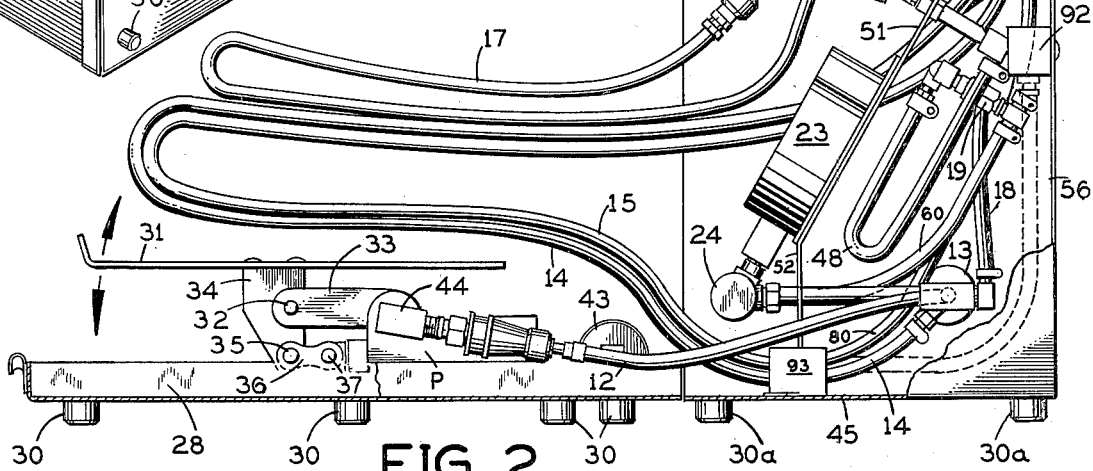
FIG. 2 is a vertical sectional view showing the apparatus after the front cover has been opened and with the low pressure gauge moved from its storage position inside the carrying case and connected in its operating position.

Referring to FIG. 1, all of the foregoing components of the present invention are contained in a rigid rectangular carrying case 26 of aluminum or other suitable material having a pivoted handle 27 at the top. This carrying case has a front cover 28 which is pivotally connected to the bottom of the case by a piano hinge 29, as shown in FIG. 6, which permits the front cover to be lowered from its normal upright position closing the front of the case (FIG. 1) to the lowered position (FIG. 6) in which it extends generally horizontally out from the lower end of the case. The front cover is provided with several ground engaging feet 30 on the outside. The bottom wall 45 of the carrying case has similar feet 30a (FIG. 2). Suitable manually releasable catches 31 enable the front cover 28 to be locked in its upright position closing the front of the carrying case, as shown in FIG. 1.

As shown in FIG. 6, the foot or hand pump P is mounted on the middle of the front cover 28 at the inside and is arranged to be operated by a pivoted pedal 31. Two of the feet 30 on the outside of the front cover are located directly below the pump P to provide a rigid support for it, particularly when the pedal 31 is operated by the user's foot. As shown in FIG. 2, the pivot 32 for the pedal 31 is carried by rigid horizontal arms 33 extending out from the housing of the pump. This pivot is operatively connected to a rigid arm 34 which extends down from the pedal 31 and has its lower end pivotally connected at 35 to one end of a linkage arm 36. The pump has a reciprocable piston which is pivotally connected at 37 to the opposite end of the linkage arm 36, so that the pump piston is reciprocated in response to pivotal displacement of the pedal 31.

As shown in FIG. 6, the burette B extends vertically inside the carrying case 26 at the right side. The top of the burette registers with an opening 40 in the top wall 41 of the carrying case. The neck of the funnel F is insertable down through this opening to facilitate filling the burette with gasoline. Normally, this opening 40 in the top of the carrying case is closed by a slidable cover 42 (FIG. 4). The burette preferably holds 0.1 gallon and has a scale with 100 evenly spaced gradations, each denoting 0.001 gallon. Also, it has a second scale with gradations 2.5 ml. apart for a total of 0.380 liter.

Figure 3:
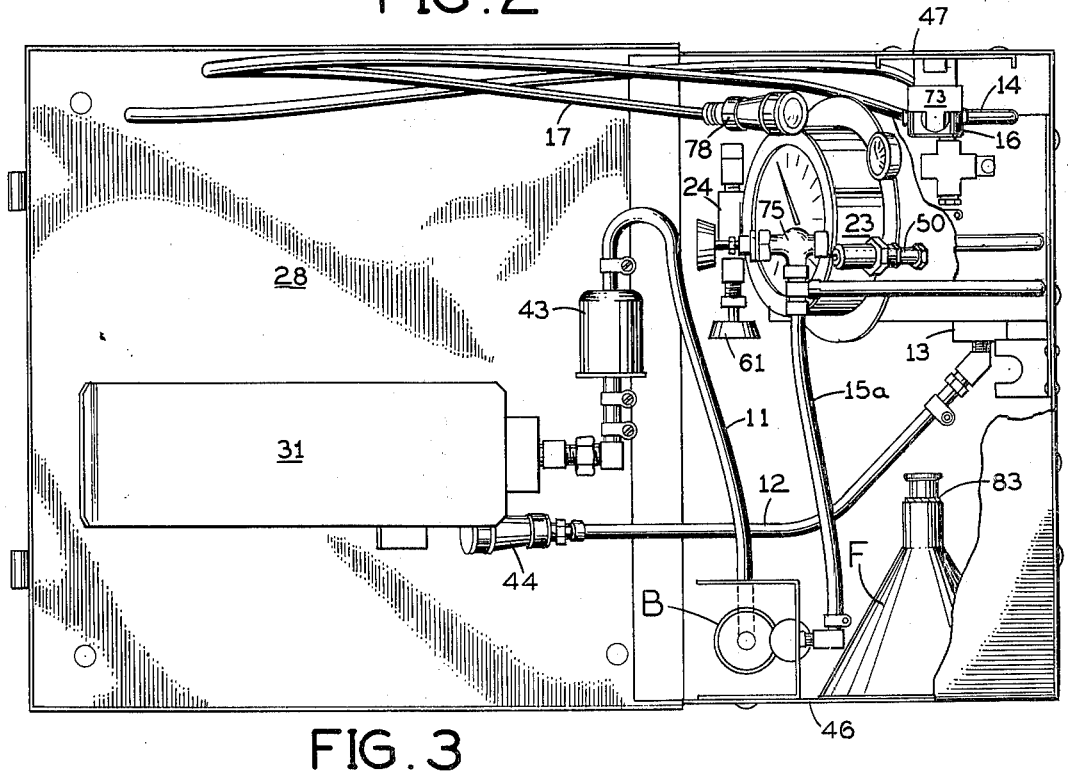
FIG. 3 is a top plan view of the apparatus as shown in FIG. 2.

The hose 11 leading from the lower end of the burette B extends to a filter 43 immediately ahead of the inlet of the pump P, as shown in FIGS. 3 and 6. There may also be a filter on the discharge side of the pump (not shown).

The outlet of this pump is connected through a fitting 44 to the hose 12 leading to the first T-fitting 13. As shown in FIGS. 2 and 3, this T-fitting 13 is located a short distance above the bottom wall 45 of the carrying case and about midway between the opposite upstanding sides 46 and 47 of the carrying case.

As shown in FIG. 2, the hose 18 extends up from one outlet of the first T-fitting 13 to the inlet of the second T-fitting 19. A first outlet of the T-fitting 19 is connected to one end of a generally U-shaped hose 48. The opposite end of this hose is connected through fittings, indicated generally at 49 in FIG. 2, to the self-closing male member 50 of a quick-disconnect coupling. As shown in FIG. 6, the coupling member 50 is located immediately in front of an upwardly and rearwardly inclined segment 51 of a support plate inside the carrying case.

The inclined support plate segment 51 has a vertical extension 52 at its lower end which is joined to a horizontal flange 53 which is riveted to the bottom wall 45 of the carrying case. The upper end of the inclined support plate segment 51 is joined to a rearward horizontal extension 54 (FIG. 2) which has a vertical flange 55 at the back that is riveted to the inside of the back wall 56 of the carrying case. The 160 psi pressure gauge 23 is directly mounted on the front of the inclined support plate segment 51 inside the carrying case, as shown in FIGS. 2 and 6.

The 15 psi pressure gauge 22 is mounted on top of the manual shutoff valve 20. This valve is attached to the upper end of a bent pipe 57, whose lower end is connected to a self-closing female coupling member 58 associated with the aforementioned male coupling member 50 at the front of the inclined support plate segment 51. When the quick-disconnect coupling 50, 58 is connected, the pipe 57 extends forward and upward from it and supports the valve 20 and the low pressure gauge 22 in front of and slightly above the top wall 41 of the carrying case, as shown in FIGS. 2 and 6. When the low pressure gauge 22 is not to be used, the female coupling member 58 may be detached from the male coupling member 50 of the quick-disconnect coupling, and the assembly of pipe 57, the valve 20 and the small pressure gauge 22 left stored inside the carrying case.

The quick-disconnect coupling 50, 58 is of known construction. When connected, it provides a fluid passage from hose 48 and fittings 49 into the pipe 57 leading to the valve 20 and the low pressure gauge 22. When the coupling 50, 58 is disconnected, each coupling member 50 and 58 automatically closes.

Referring to FIG. 2, the second outlet of T-fitting 19 is connected to a short flexible hose 60 which curves down and forward through an opening in the lower vertical extension 52 of the support plate and is connected to the inlet of the valve 24. This valve has a bypass passage which connects its inlet to the 160 psi pressure gauge 23 whether the valve is open or closed. The valve 24 is operated by a handle 61 (FIG. 3). The outlet 24a (FIG. 4) of valve 24 is connected through fittings 62 to the lower end of the pressure release hose 25, which (as shown in FIG. 2) extends back through an opening in the lower vertical extension 52 of the support plate and then up along the inside of the back wall 56 of the carrying case and beneath the top wall 41 of the carrying case to the upper end of the burette B.

Referring to FIG. 5, the air bleed device 16 has a generally cylindrical body with a truncated flat top. At its right side the body of the air bleed device has an upwardly and inwardly inclined passage 65. The upper end of the first long hose 14 is connected to the lower end of passage 65. At its left side, the body of the air bleed device has an oppositely inclined passage 66. The upper end of the second long hose 17 is connected to passage 66. The adjacent upper ends of the diagonal passages 65 and 66 are connected by a vertical bore 67 formed in the body of the air bleed device, and therefor the upper ends of the hoses 14 and 17 are in continuous fluid communication with each other through the interior of the air bleed device 16.

A transparent dome 68 is mounted on top of the body of the air bleed device 16 so as to be visible when the apparatus is in use. The lower end of the dome is threadedly received in a screw-threaded opening 69 extending down from the flat top of the body of the air bleed device and intersecting the bore 67 coaxially at the latter's upper end. An O-ring 70 of rubber-like material provides a fluid-tight seal for the lower end of the dome 68.

The upper end of the air bleed hose 15 is connected to a bent pipe 71 which extends coaxially up through the central bore 67 in the body of the air bleed device and up inside the transparent dome 68. An annular plug 72 provides a fluid-tight seal between this pipe and the lower end of the bore 67. The top edge of the pipe 71 is a short distance below the top of the dome 68.

In operation, any air bubbles in the gasoline flowing up through the first long hose 14 go up into the dome 68 and then pass down through pipe 71 and into the air bleed hose 15 leading back to the top of the burette B, where these air bubbles are vented to the atmosphere. Any such air bubbles will be readily visible at the dome 68. Any gasoline entrained with the air bubbles is emptied into the top of the burette.

The body of the air separation device 16 is attached to a permanent magnet 73 which enables it to be removably mounted on a ferrous part near the top of the dispensing apparatus D as shown in FIG. 1. Typically, the housing of the dispensing apparatus has parts of steel to which the magnet will adhere and support the weight of the air separation device 16, the hoses 14, 15 and 17, and the gasoline in those hoses.

Referring to FIG. 4, the opposite end of the air bleed hose 15 (away from the air bleed device 16) extends up inside the carrying case 26 near the latter's left side and is connected to the inlet of a precisely adjustable needle valve 75 carried by a bracket 76 attached to the top of the carrying case. The outlet of this air bleed valve 75 is connected to a hose 15a extending directly beneath the top of the carrying case to the upper end of the burette B. With this arrangement, when valve 75 is open, any air bubbles reaching the air bleed device 16 will be separated out and vented to the atmosphere via hose 15, valve 75 and hose 15a.

As shown in FIG. 6, when the present apparatus is in use, the makeup gasoline supply hose 14 and the air bleed hose 15 are coupled to each other by several clips or ties 77 along their respective lengths between the carrying case 26 and the air bleed device 16 to facilitate handling them together.

The second long hose 17 connected to the air bleed device 16 has a self-closing female coupling member 78 on its lower end. This coupling member is attachable to a self-closing male coupling member 79 (FIG. 6) on one end of a short, flexible, connector hose 80. The coupling members 78 and 79 together provide a quick-disconnect coupling. The opposite end of the connector hose 80 carries a swivel fitting 81 which is threadedly insertable into a complementary opening at 82 leading into the air eliminator of the suction pump in the dispensing apparatus D. (Normally, this opening is closed by a screw-threaded plug, which must be removed to permit the connection of the swivel fitting 81.)

Since the opening 82 may be one of several sizes (⅛ inch, ¼ inch or ⅜ inch), the swivel fitting 81 on the hose 80 may require an adapter 83, as shown in FIG. 7. The threaded hollow stem 84 on the swivel fitting 81 will fit a ¼ inch screw-threaded opening at 82 on the dispensing apparatus D, but the adapter 83 must be attached to stem 84 if the screw-threaded opening at 82 is either ⅛ inch or ⅜ inch. The swivel fitting carries an O-ring 85 of rubber-like material encircling its stem 84 to provide a fluid-tight seal when the stem is screwed into the opening 82.

The adapter 83 has a knurled head 86 at its upper end with a screw-threaded axial opening for threadedly receiving the swivel fitting stem 84. Below this head the adapter presents in succession a cylindrical segment 87, a ⅜ inch diameter screw-threaded segment 88, and a ⅛ inch diameter screw-threaded segment 89. An O-ring 90 of a rubber-like material is located at the transverse annular shoulder between the cylindrical segment 87 and the ⅜ inch threaded segment 88. Another O-ring 91 is located at the shoulder between the threaded segments 88 and 89 of the adapter. The adapter has a central passageway extending from the head 86 at its upper end through the threaded segment 89 at its lower end.

If the plug removed from the opening at 82 is either ⅛ inch or ⅜ inch in diameter, then the adapter 83 is attached to the stem 84 of the swivel fitting 81 and is threadedly inserted into this opening.

FIG. 9 shows a typical installation in which the swivel fitting 81 is connected at an opening which leads into the air eliminator in a suction pump S in a dispensing apparatus D. This pump has a vent hose H (FIG. 6) which extends up to a vapor release V on the outside of the dispensing apparatus D. This vapor release is a mushroom-shaped cap with a slot at the bottom for venting vapors to the atmosphere. Alternatively, the vapors may be vented to the atmosphere through the hose hanger fitting on the dispensing apparatus D.

Where the dispensing apparatus is operatively connected to a remote pumping system (i.e., with the pump located directly above the underground storage tank), the swivel fitting 81 and the adapter 83 (if necessary) are connected to the usual impact valve at the base of the dispensing apparatus (for example, as shown in FIG. 1 of my U.S. Pat. No. 3,910,102).

In the preferred embodiment of the present apparatus, as shown in FIG. 4, four of the short connector hoses 80 are provided, each having a self-closing male coupling member 79 on the end and a swivel fitting 81 on the opposite end. The back wall 56 of the carrying case on the insdide carries a block 92 (immediately to the left of the burette B in FIG. 4) which has four screw-threaded openings for threadedly receiving the respective screw-threaded stems 84 on the swivel fitting 81. The bottom wall 45 of the carrying case on the inside carries a block 93 with openings which snugly receive the male coupling members 79 on the four connector hoses 80, as shown in FIG. 2. This arrangement enables any one or more of the connector hoses 80 to be readily removed from the carrying case, when needed.

As shown in FIG. 4, when the apparatus is not in use, the funnel F is stored inside the carrying case behind the upper end of the burette B, with the wide mouth of the funnel abutting against the inside of the right wall 46 of the carrying case. In this position the funnel holds a light, hollow ball 94 of polypropylene or other suitable material for a purpose explained hereinafter. The neck 95 of the funnel slidably but snugly receives a plug 96 on the lower end of a cantilevered leaf 97 of spring metal which is self-biased to the vertical position shown in full lines in FIG. 4 to hold the funnel in the position shown. The leaf 97 may be retracted manually to the phantom line position in FIG. 4 to permit the funnel F to be removed from the carrying case.

When the second long hose 17 is stored inside the carrying case the female coupling member 78 on its free end (remote from the air bleed device 16) snugly but slidably receives a plug 98 (FIG. 10) which is suspended by a bead chain 99 from the top of the carrying case. The plug and bead chain suspend the coupling member 78 inside the case at the position shown in FIG. 2. The opposite end of hose 17 is attached to the air bleed device 16, as shown in FIG. 5.

FIGS. 2 and 3 show the position of the parts after the front cover 28 has been lowered and the sub-assembly of the 15 psi pressure gauge 22, valve 20, pipe 57 and coupling member 58 have been installed, but before the air bleed device 16 has been mounted on the dispensing apparatus D and the hose 17 and the short connector hose 80 have been connected to the gasoline line for the dispensing apparatus D. Therefore, these Figures also indicate the positions of the latter parts when stored in the carrying case 26 with its front cover 28 closed. The magnet 73 which carries the air separation device 17 is mounted on the inside of the carrying case side wall 47 near its upper back corner.

FIG. 6 shows a typical position of these parts when the apparatus is applied to the dispensing apparatus D. In FIG. 6, the slide cover 42 at the top of the carrying case directly above the burette B has been moved out of the way and the neck of the funnel F has been inserted down through the opening which had been closed by this slide cover. The funnel holds the ball 94 just above the funnel neck. The ball floats when liquid is being poured down into the funnel and then it sealingly engages the funnel at the top of its neck to prevent evaporation.

If desired, in place of this ball a fine screen might be placed in the neck of the funnel to serve as a filter and also to reduce the evaporation of gasoline in the burette.

After shutting down the suction pump S in the dispensing apparatus D, the plug is removed from the opening at 82 which leads into the air eliminator of this pump. One of the short connector hoses 80 is removed from the carrying case and its swivel fitting 81 is attached to the suction pump S at this opening 82, as described.

Next, the plug 98 is removed from the female coupling member 78 in the hose 17, and this end of hose 17 is removed from the carrying case and its coupling member 78 is attached to the male coupling member 79 on the free end of the short connector hose 80.

Following this, the air bleed device 16 and its support magnet 73 are removed from the carrying case and the magent is applied to a ferrous part of the dispensing apparatus D as close to the top as possible. The hose 14 extends from the T-fitting 13 inside the carrying case up to the air bleed device 16, and the air bleed hose 15 extends between the air bleed device 16 and the shutoff valve 75 inside the carrying case. The hoses 14 and 15 (as well as the hose 17) are pre-attached to the air bleed device 16, as shown in FIG. 5.

The 160 psi pressure gauge 23 is permanently connected to the T-fitting 19. The 15 psi pressure gauge 22 and its shutoff valve 20 may or may not be connected to the T-fitting 19, as described, depending upon the tests about to be performed. In the case of the suction pump system for the dispensing apparatus D, the 15 psi pressure gauge 22 is connected.

The next step is to remove all air from the dispensing apparatus and its suction pump S, the gasoline line from the underground storage tank to the suction pump, and the present test apparatus itself. After the burette B is filled with gasoline through the funnel F, the foot or hand pump P in the present test apparatus is operated to withdraw gasoline from the lower end of the burette and pump it via hose 12, T-fitting 13 and hose 14 up to the air bleed device 16, which is now mounted on the dispensing apparatus D. The gasoline flows down from the air bleed device 16 through hose 17 and connector hose 80 into the air eliminator of the suction pump S.

This pumping operation may begin to develop a combined liquid and air pressure approaching the 15 psi limit of the gauge 22. To prevent over-pressurizing, the user may stop operating the pump 20 and may open the valve 75 in the air bleed line 15, 15a going back to the top of the burette B. This will permit bubbling to occur in the air bleed device 16. Air bubbles and any entrained liquid will return to the top of the burette, and the air compressed there will unseat the ball 94 and escape to the atmosphere while the returned liquid goes into the burette.

The foregoing operation may be repeated as often as required to completely fill the float chamber of the suction pump S with liquid gasoline.

When air no longer appears in the test apparatus, the air bleed valve 75 is closed. The user continues operating the pump P until the low pressure gauge 22 reaches a predetermined safe limit, such as 12 psi.

Now the user again refills the burette B to exactly the 0.1 gallon level and the leak test procedure is carried out substantially as described in my U.S. Pat No. 3,910,102 under the heading "SUCTION SYSTEM — FIGS. 7 AND 8".

When the present test apparatus is used to test for leakage in a remote pump system, the 15 psi pressure gauge 22 is disconnected from the test apparatus at the quick-disconnect coupling 50, 58. The connector hose 80 is connected to the impact valve at the dispensing apparatus which is farthest from the remote pump installed in the underground storage tank or the dispenser at the highest elevation. The air bleed device 16 is mounted on this dispensing apparatus near the top.

To purge the pumping system and the present test apparatus of air, the remote pump is turned on without opening any of the dispenser nozzles connected to it. The air bleed valve 75 in the test apparatus is opened, permitting the escape of air in the manner already described in detail. Gasoline is pumped by the remote pump through the short connector hose 80 and the long hose 17 into the air eliminator 16 and from there through hose 14 to the outlet side of the foot or hand operated pump P in the test apparatus.

The burette B gradually becomes filled with gasoline which is entrained with the air bubbles in the air bleed device 16. The air bleed valve 75 is gradually closed to throttle this flow as the burette becomes filled, and it is closed fully to bring the burette reading to precisely 0.1 gallon.

The user observes the pressure on the 160 psi gauge 23 when the air bleed valve 75 is fully closed and the remote pump is still on. This pressure and the reading time are recorded.

Then the remote pump is turned off, and the operator follows the remainder of the procedure set forth in my U.S. Pat. No. 3,910,102 under the heading "OPERATION — FIGS. 1-6".

I claim:

1. In an apparatus for detecting a leak in a gasoline line extending from an above-ground gasoline dispensing apparatus down to an underground gasoline storage tank provided with a check valve for preventing return flow of gasoline back down into the tank, the combination of:
   a carrying case having a cover which may be opened to expose the interior of the case;
   a burette extending vertically inside said case;
   a person-operated pump in said case having its inlet connected to the lower end of said burette to receive makeup gasoline therefrom;
   pressure gauge means in said case operatively connected to the outlet of said pump to display the latter's output pressure;
   an air bleed device in said case having means therein for separating air from liquid;
   a first long flexible hose in said case operatively connected between the outlet of said pump and said air bleed device;
   a second long flexible hose in said case connected to said air bleed device and in liquid communication thereat with said first hose;
   coupling means in said case for connecting the opposite end of said second hose to said gasoline line at said dispensing apparatus;
   an air bleed hose in said case operatively connected at one end to said air bleed device to receive air and entrained liquid therefrom;
   and a bleed valve in said case operatively connected between said air bleed hose and the top of the burette to control the flow of air and entrained liquid from said air bleed device through said air bleed hose to the top of the burette.

2. An apparatus according to claim 1, wherein said cover is a front cover hinged to the bottom of the carrying case, and said person-operated pump is mounted on the inside of said cover to be accessible by the user when the cover is lowered.

3. An apparatus according to claim 1, and further comprising permanent magnet means operatively connected to said air bleed device for mounting the latter on a ferrous part of the dispensing apparatus.

4. An apparatus according to claim 3, wherein said bleed valve is a precisely adjustable valve.

5. An apparatus according to claim 1, and further comprising a flexible pressure release hose operatively connected between the outlet of said pump and the top of the burette, and a manual shutoff valve operatively connected to said pressure release hose to control the flow therethrough.

6. An apparatus according to claim 4, wherein said air bleed device comprises a body having a pair of upwardly and inwardly inclined passages with their lower ends located on opposite sides of said body and connected respectively to said first and second hoses, said body having a vertical bore extending up between said inclined passages and connecting their upper ends, a transparent dome on top of said body above said vertical bore and in fluid communication with the latter's upper end, and a pipe extending up through said bore and terminating at its upper end inside said dome above the upper ends of said diagonal passages, said pipe having its lower end connected to said air bleed hose.

7. An apparatus according to claim 3, wherein said air bleed device comprises a body having a pair of upwardly and inwardly inclined passages with their lower ends located on opposite sides of said body and connected respectively to said first and second hoses, said body having a vertical bore extending up between said inclined passages and connecting their upper ends, a transparent dome on top of said body above said vertical bore and in fluid communication with the latter's upper end, and a pipe extending up through said bore and terminating at its upper end inside said dome above the upper ends of said diagonal passages, said pipe having its lower end connected to said air bleed hose.

8. An apparatus according to claim 3, wherein said cover is a front cover hinged to the bottom of the carrying case, and said person-operated pump is mounted on the inside of said cover to be accessible by the user when the cover is lowered.

9. An apparatus according to claim 8, wherein said pressure gauge means comprises:
   a high capacity pressure gauge permanently connected to the outlet of said pump;
   a low capacity pressure gauge;
   and a self-closing, quick-disconnect coupling means for releasably connecting said low capacity pressure gauge to the outlet of said pump.

10. An apparatus according to claim 9, and further comprising:
    a rigid pipe carrying said low capacity pressure gauge at one end;
    and a self-closing, quick-disconnect coupling member on the opposite end of said pipe.

11. An apparatus according to claim 8, wherein said case has an opening in the top leading down into the top of the burette and further comprising:
    a removable closure for said opening;
    a funnel inside said case having a reduced neck for insertion down through said opening;
    and means in the case for positioning the funnel therein.

12. An apparatus according to claim 3, wherein said case has an opening in the top leading down into the top of the burette and further comprising:
    a removable closure for said opening;
    a funnel inside said case having a reduced neck for insertion down through said opening;
    and means in the case for positioning the funnel therein.

13. An apparatus according to claim 12, wherein:
    said cover is a front cover hinged to the bottom of the carrying case;
    said person-operated pump is mounted on the inside of said cover to be accessible by the user when the cover is lowered;
    said bleed valve is a precisely adjustable valve;
    said air bleed device comprises a body having a pair of upwardly, and inwardly inclined passages with their lower ends located on opposite sides of said body and connected respectively to said first and second hoses, said body having a vertical bore extending up between said inclined passages and connecting their upper ends, a transparent dome on top of said body above said vertical bore and in fluid communication with the latter's upper end, and a pipe extending up through said bore and terminating at its upper end inside said dome above the upper ends of said diagonal passages, said pipe having its lower end connected to said air bleed hose;

and said pressure gauge means comprises a high capacity pressure gauge permanently connected to the outlet of said pump, and a low capacity pressure gauge;

and further comprising:

a rigid pipe carrying said low capacity pressure gauge at one end;

a self-closing, quick-disconnect coupling member on the opposite end of said pipe;

a self-closing, quick-disconnect coupling member connected to the outlet of said pump and cooperable with said coupling member on said pipe to provide a quick-disconnect coupling;

and a flexible pressure release hose operatively connected between the outlet of said pump and the top of the burette, and a manual shutoff valve operatively connected to said pressure release hose to control the flow therethrough.

14. An apparatus according to claim 1, wherein said pressure gauge means comprises:

a high capacity pressure gauge permanently connected to the outlet of said pump;

a low capacity pressure gauge;

and a self-closing, quick-disconnect coupling means for releasably connecting said low capacity pressure gauge to the outlet of said pump.

15. An apparatus according to claim 14, and further comprising:

a manual shutoff valve connected to the inlet of said low capacity pressure gauge;

a rigid pipe carrying said shutoff valve and said low capacity pressure gauge at one end;

and a self-closing, quick-disconnect coupling member on the opposite end of said pipe.

16. An apparatus according to claim 1, wherein said second hose has a self-closing, quick-disconnect coupling member on its opposite end, and said coupling means comprises a short, flexible, connector hose having a self-closing, quick-disconnect coupling member on one end which cooperates with said coupling member on the second hose to provide a releasable, quick-disconnect coupling, and a swivel fitting on the opposite end of said connector hose for connection to said gasoline line at said dispensing apparatus.

17. An apparatus according to claim 16, wherein said coupling member on the second hose is a female coupling member, and further comprising flexible suspension means extending down inside said case from the top of the latter, and a plug on the lower end of said suspension means slidably received snugly in said last-mentioned coupling member to position the latter inside the case.

18. An apparatus according to claim 17 and further comprising a pair of blocks attached respectively to the back and bottom walls of said carrying case on the inside, said blocks having openings for respectively receiving and locating said coupling member and said swivel fitting on the connector hose when the latter is stored in the carrying case.

19. An apparatus according to claim 18, wherein each of said blocks has a plurality of said openings, and wherein there are a plurality of said connector hoses with their respective coupling members and swivel fittings received in said openings in the blocks.

20. An apparatus according to claim 1, wherein:

said case has an opening in the top leading down into the top of the burette;

a removable closure for said opening;

a funnel inside said case having a reduced neck for insertion down through said opening;

and means in the case for positioning the funnel therein.

21. An apparatus according to claim 20, wherein said positioning means comprises a flexible leaf extending down inside said case from the top of the latter, and a plug on the lower end of said leaf slidably received snugly inside the neck of the funnel to hold the funnel with its mouth abutting against an adjacent side wall of the case.

22. An apparatus according to claim 1, wherein said bleed valve is a precisely adjustable valve.

23. An apparatus according to claim 1, and further comprising a flexible pressure release hose operatively connected between the outlet of said pump and the top of the burette, and a manual shutoff valve operatively connected to said pressure release hose to control the flow therethrough.

24. An apparatus according to claim 1, wherein said air bleed device comprises a body having a pair of upwardly and inwardly inclined passages with their lower ends located on opposite sides of said body and connected respectively to said first and second hoses, said body having a vertical bore extending up between said inclined passages and connecting their upper ends, a transparent dome on top of said body above said vertical bore and in fluid communication with the latter's upper end, and a pipe extending up through said bore and terminating at its upper end inside said dome above the upper ends of said diagonal passages, said pipe having its lower end connected to said air bleed hose.

25. In an apparatus for detecting a leak in a gasoline line extending from an above-ground gasoline dispensing apparatus down to an underground gasoline storage tank provided with a check valve for preventing return flow of gasoline back down into the tank, said apparatus having:

a burette for holding makeup gasoline;

a person-operated pump having its inlet connected to the lower end of said burette to receive makeup gasoline therefrom;

pressure gauge means operatively connected to the outlet of said pump to display the latter's output pressure;

the improvement which comprises:

an air bleed device having means therein for separating air from liquid;

means for detachably mounting said air bleed device on the dispensing apparatus;

a first long flexible hose operatively connected between the outlet of said pump and said air bleed device;

a second long flexible hose connected to said air bleed device and in liquid communication thereat with said first hose;

coupling means for detachably connecting the opposite end of said second hose to said gasoline line at said dispensing apparatus;

an air bleed hose operatively connected at one end to said air bleed device to receive air and entrained liquid therefrom;

and a bleed valve operatively connected between said air bleed hose and the top of the burette to control the flow of air and entrained liquid from said air bleed device through said bleed hose to the top of the burette.

26. An apparatus according to claim 25, wherein said means for detachably mounting said air bleed device is a permanent magnet connected to said air bleed device.

27. An apparatus according to claim 26, wherein said bleed valve is a precisely adjustable valve.

28. An apparatus according to claim 25, wherein said air bleed device comprises a body having a pair of upwardly and inwardly inclined passages with their lower ends located on opposite sides of said body and connected respectively to said first and second hoses, said body having a vertical bore extending up between said inclined passages and connecting their upper ends, a transparent dome on top of said body above said vertical bore and in fluid communication with the latter's upper end, and a pipe extending up through said bore and terminating at its upper end inside said dome above the upper ends of said diagonal passages, said pipe having its lower end connected to said air bleed hose.

29. An apparatus according to claim 28, wherein said means for detachably mounting said air bleed device is a permanent magnet at the back of said air bleed device.

30. An apparatus according to claim 25, and further comprising a pressure release hose operatively connected between the outlet of said pump and the top of said burette, and a manual shutoff valve operatively connected to said pressure release hose to control the flow therethrough.

* * * * *